United States Patent
Despax et al.

(10) Patent No.: US 6,801,857 B2
(45) Date of Patent: Oct. 5, 2004

(54) METHOD AND DEVICE FOR DETERMINING THE QUALITY OF AN OIL WELL RESERVE

(75) Inventors: Damien Despax, Aix-en-Provence (FR); Robert Dovis, Aix-en-Provence (FR); Jean-Michel Fedele, Marignane (FR); Jean-Pierre Martin, Le Vaudreuil (FR)

(73) Assignee: Innov-Pro, Le Vaudreuil (FR)

( * ) Notice: Subject to any disclaimer, the term of this patent is extended or adjusted under 35 U.S.C. 154(b) by 0 days.

(21) Appl. No.: 10/432,909
(22) PCT Filed: Nov. 12, 2001
(86) PCT No.: PCT/FR01/03513
§ 371 (c)(1),
(2), (4) Date: May 29, 2003
(87) PCT Pub. No.: WO02/46563
PCT Pub. Date: Jun. 13, 2002

(65) Prior Publication Data
US 2004/0049346 A1 Mar. 11, 2004

(30) Foreign Application Priority Data
Dec. 4, 2000 (FR) .............................. 00 15647

(51) Int. Cl.$^7$ ................... E21B 49/00; E21B 47/06; G01L 9/00
(52) U.S. Cl. ........................................... 702/13
(58) Field of Search ............................ 702/6, 9, 12, 13; 166/252.1, 252.2; 73/152.18, 152.19, 152.21, 152.29, 152.39

(56) References Cited

U.S. PATENT DOCUMENTS 3,559,476 A 2/1971 Kuo et al.
6,152,226 A * 11/2000 Talwani et al. .......... 166/252.4

FOREIGN PATENT DOCUMENTS

FR 2 678 679 A 1/1993

* cited by examiner

Primary Examiner—Donald McElheny, Jr.
(74) Attorney, Agent, or Firm—Young & Thompson

(57) ABSTRACT

Methods and devices for determining the quality of an oil well reserve or the like delivering a given fluid derived from a productive layer, by measuring the response R of the well. The method implemented by the device comprises modulating the fluid flow rate (4) in the well (1) by a sinusoidal function with a controllable preventer (5), and measuring the variations in flow rate and pressure of the fluid respectively with a flow meter (7) and a pressure sensor (9), the response Rc of the well (1); if the productive layer comprises a damaged zone having a positive formation damage of non-null thickness, is obtained by the equation (I), and the response Rf of the well; if the productive layer comprises a fracture having a negative formation damage, is obtained by the equation (II). The invention is applicable to oil prospecting.

7 Claims, 4 Drawing Sheets

METHOD AND DEVICE FOR DETERMINING THE QUALITY OF AN OIL WELL RESERVE

The present invention relates to methods and apparatuses for determining the reserve quality of an oil well delivering a given fluid coming from a productive layer, by measuring the response R of the well.

Oil is produced from wells made in oil fields, and such oil fields are to be found in various different types of ground and subsoil which do not all have the same production quality. This quality is represented essentially by the productivity index IP of the well which depends on the radius of the well $r_w$, the drainage radius $R_e$ of the well, the viscosity $\mu$ of the recoverable oil, and also the transmissivity of the productive layer which is defined as the product of its permeability k multiplied by its height h, and possibly also on any clogging of the pores in the rock in the vicinity of the wall of the well which is quantified by a dimensionless parameter S commonly referred to by the person skilled in the art under the generic term "skin". This productivity index is given by the following formula:

$$IP = \frac{2\pi k h}{\mu \left[\ln\left(\frac{R_e}{r_w}\right) - 0.75 + S\right]}$$

where ln represents the natural logarithm.

The productivity index IP is a direct measure of the ease with which oil can flow into the well under the effect of a drop $\Delta P$ in the mean pressure of the deposit around the well, since the flow rate Q of the well as measured in downhole conditions is then equal merely to:

$$Q = IP \Delta$$

This downhole flow rate is then evacuated to the surface using means that are known in themselves.

In order to optimize production from a well, in particular an oil well, it is therefore useful to know its reserve quality, in particular by determining the values of certain defined parameters. Referring to the expression for the productivity index IP given above, a first important parameter is the permeability k of the productive layer of the subsoil in which the well has been drilled, and another is the "skin" S which quantifies possible damage to the productive layer. It is thus possible to establish two classes of well from which production is low: wells that are maintained under ideal operating conditions (S=0) but which are taking oil from rock that has low permeability; and wells drilled in deposits presenting high permeability, but which have become clogged (S>0) and which could produce more after being restored by using techniques that are themselves known.

It is therefore important to be able to detect the formation of a layer of clogging in order to take action as soon as possible in effective manner to eliminate that layer and to continue working the well.

Various methods have been developed for monitoring the production quality of a well. Most of the old methods are based on using empirical or statistical relationships between various measurements that can be performed on such a well. Another method giving results that are more accurate consists in completely closing the outlet of the well and in studying the rise in the pressure of the oil in the well as a function of closure time, where examination of curves plotting variation in said pressure makes it possible to deduce whether the well is in its ideal state or whether it is clogged.

That method makes it possible to obtain good results, but it presents the major drawback of being lengthy to implement. In order to obtain a curve that is useful, it is necessary to wait for several hours, or even several days with some wells, during which time the well is not in use, thus constituting certain loss of production, to which there needs to be added the cost of restarting when the pressure of the deposit is no longer sufficient for the well to remain eruptive.

To mitigate that drawback, attempts have been made to develop another method which consists in modulating closure of the well at its outlet and in studying the variation in the pressure of the fluid as a function of such modulation. That method eliminates the above-mentioned drawback of total closure of the well, but presents the drawback of leading to measurements that are not sufficiently accurate.

For example, another method is described in U.S. Pat. No. 3,559,476 and FR-A-2 678 679. It consists in modulating the flow rate of the fluid in the well by means of a sinewave function and in measuring the variations in the flow rate and the pressure of the fluid, from which the response R of the well is deduced in certain special cases.

That method gives results that are relatively satisfactory when the damage to the well consists in its wall being clogged so as to give a positive "skin" value, and providing the "skin" has thickness that can be assumed to be zero. Clearly that type of infinitely thin "skin" is merely a convenient mathematical abstraction which is often satisfactory, but other types of damage can exist which correspond to a positive value for the "skin" but for which the thickness of the "skin" cannot be taken as being zero, or which correspond to a negative value for the "skin", for example when a well is connected to a network of natural cracks that are open or when a well is being stimulated by hydraulic fracturing, i.e. has an artificially induced fracture passing through it, which fracture is generally symmetrical relative to the axis of the well.

An object of the present invention is thus to mitigate the above-mentioned drawbacks of prior methods of evaluating the reserve quality of an oil well or the like, and to provide a method which, while being easy to implement, nevertheless enables such evaluation to be performed at all levels of the well and regardless of the type of damage to the productive layer, by means of measurements which can be interpreted with a low error percentage of uncertainty.

Another object of the present invention is to provide apparatus enabling the method to be implemented.

More precisely, the present invention provides a method of determining the reserve quality of an oil well or the like delivering a given fluid coming from a productive layer, by measuring the response R of the well, said method consisting in modulating the flow rate of the fluid in the well by means of a sinewave function, and in measuring the variations in the flow rate and the pressures of the fluid, the method being characterized by the fact that:

I) the response Rc of the well when said productive layer includes a damaged zone presenting a positive "skin" value S for "skin" of non-zero thickness is obtained by the equation:

$$R_c = \frac{D_{R_0}(\beta z_w) - B}{-C_{R_0}(\beta z_w) + A},$$

and that

II) the response Rf of the well when the productive layer has a fracture presenting a negative "skin" value S is obtained by the equation:

$$R_f = \frac{\pi}{F_{CD}\sqrt{\frac{i z_f^2}{E_{fD}} + \frac{2\sqrt{i} z_f}{F_{CD}}}} + S_{wf}$$

in which equations:

A, B, C, and D are functions of the parameters $z_w$, $\alpha$, and $\beta$, as defined below, and are respectively defined by the following four equations:

$$A(z_w, \alpha, \beta) = i\frac{z_w}{\sqrt{\alpha}} e^{\frac{i\pi}{4}} \left[ kelbe_0\left(\frac{\beta z_w}{\sqrt{\alpha}}\right) kelke_1\left(\frac{z_w}{\sqrt{\alpha}}\right) - kelbe_1\left(\frac{z_w}{\sqrt{\alpha}}\right) kelke_0\left(\frac{\beta z_w}{\sqrt{\alpha}}\right) \right]$$

$$B(z_w, \alpha, \beta) = \frac{1}{\alpha}\left[ kelbe_0\left(\frac{z_w}{\sqrt{\alpha}}\right) kelke_0\left(\frac{\beta z_w}{\sqrt{\alpha}}\right) - kelbe_0\left(\frac{\beta z_w}{\sqrt{\alpha}}\right) kelke_0\left(\frac{z_w}{\sqrt{\alpha}}\right) \right]$$

$$C(z_w, \alpha, \beta) = i\beta_{z_w}^2 \left[ kelbe_1\left(\frac{z_w}{\sqrt{\alpha}}\right) kelbe_1\left(\frac{\beta z_w}{\sqrt{\alpha}}\right) - kelbe_1\left(\frac{\beta z_w}{\sqrt{\alpha}}\right) kelke_1\left(\frac{z_w}{\sqrt{\alpha}}\right) \right]$$

$$D(z_w, \alpha, \beta) = i\frac{\beta z_w}{\sqrt{\alpha}} e^{\frac{i\pi}{4}} \left[ kelbe_0\left(\frac{z_w}{\sqrt{\alpha}}\right) kelke_1\left(\frac{\beta z_w}{\sqrt{\alpha}}\right) - kelbe_1\left(\frac{\beta z_w}{\sqrt{\alpha}}\right) kelke_0\left(\frac{z_w}{\sqrt{\alpha}}\right) \right]$$

it being specified that in the equations given above:

$$kelke_n(x) = ker_n(x) + i\, kei_n(x)$$

and $$kelbe_n(x) = ber_n(x) + i\, bei_n(x)$$

where i is the imaginary unit number in the mathematical theory of complex numbers and where $ker_n$, $kei_n$, $ber_n$, and $bei_n$ are Kelvin functions;

$$\alpha = \frac{k_s}{k}$$

is the non-dimensional permeability of the damaged zone, $k_s$ representing the permeability of the damaged zone, and k representing the permeability of the productive layer;

$$\beta = \frac{r_s}{r_w}$$

is the non-dimensional radius of the damaged zone, $r_s$ representing the radius of the damaged zone, and $r_w$ representing the radius of the well;

$$z_w = r_w \sqrt{\frac{\omega}{\delta}}$$

where $\omega$ is the angular frequency of the sinewave function and $\delta$ is the diffusivity of the productive layer equal to $$\frac{k}{\varphi \mu c_t},$$

$\phi$ representing the porosity of the productive layer, $\mu$ representing the viscosity of the fluid, and $c_t$ representing the total compressibility of the fluid;

$$R_0 = \frac{K_0(\sqrt{i}\, z_w)}{\sqrt{i}\, z_w K_1(\sqrt{i}\, z_w)}$$

where $K_0$ and $K_1$ are modified Hankel functions; and also with $$z_f = x_f \sqrt{\frac{\omega}{\delta}}$$

where $x_f$ is the length of one of the wings of the fracture which is assumed to have two wings; $F_{CD}$ is the non-dimensional conductivity of the fracture represented by the formula $$\frac{k_f w}{k x_f},$$

where $k_f$ represents the permeability of the material supporting the fracture and w represents the mean thickness of the supported fracture;

$$E_{fD} = \frac{k_f \varphi c_t}{k \varphi_f c_{tf}}$$

is the non-dimensional diffusivity of the fracture, $\phi_f$ representing the porosity of the support material filling the fracture, and $c_{tf}$ representing the total compressibility of the fluid in the fracture; $S_{wf}$ is a "skin" if any, existing between the bottom of the well and the entry of the fracture.

The present invention also provides apparatus for implementing the above-defined method.

Other characteristics and advantages of the present invention appear from the following description given with reference to the accompanying illustrative but non-limiting drawings, in which.

Figure 2:
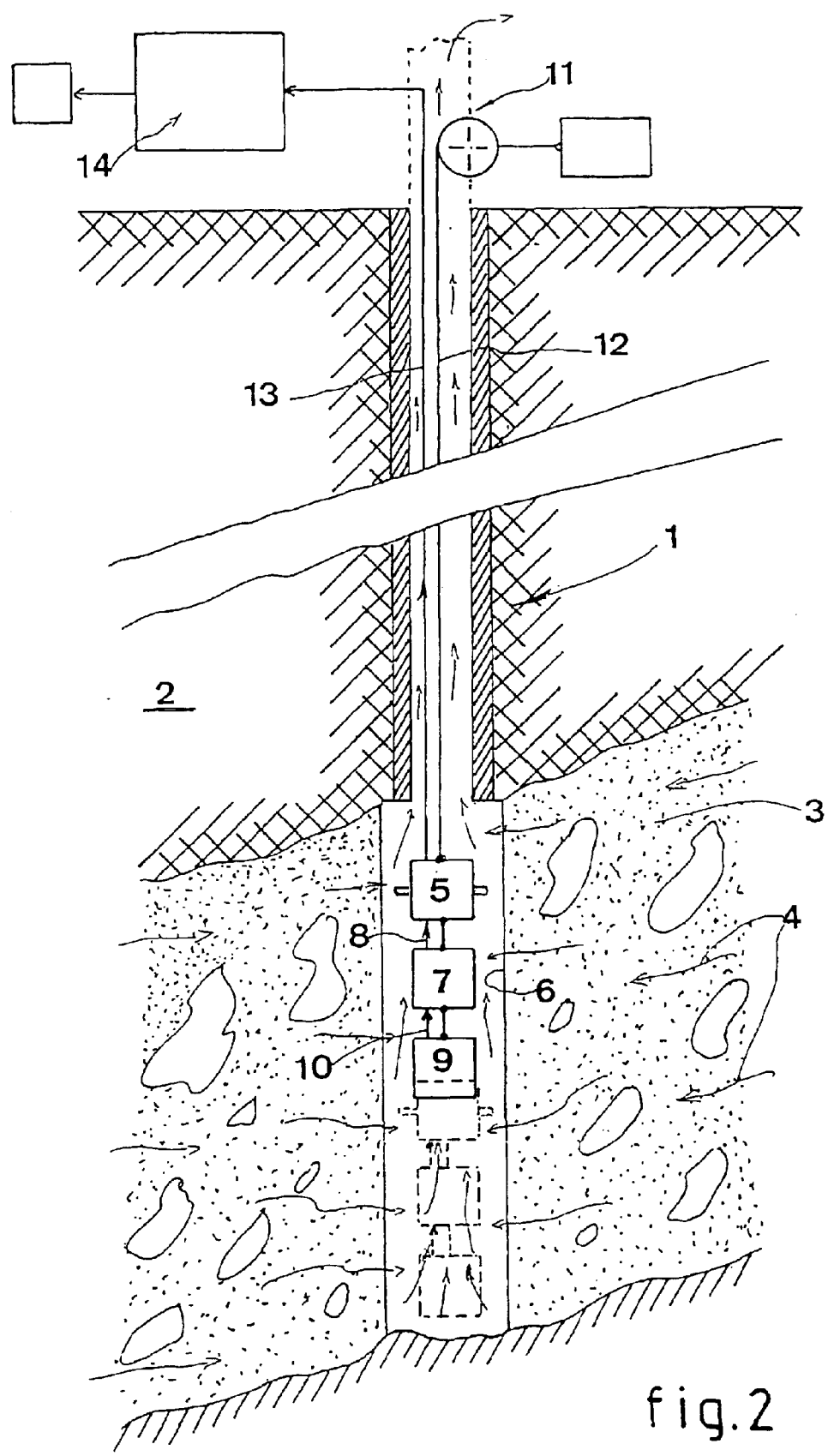
FIG. 2 is a diagram showing an embodiment of apparatus enabling the method of the invention to be implemented.

FIG. 2 is a diagrammatic section of an oil well 1 drilled in ground 2 down to productive layers 3 containing oil. In general manner, these layers are formed of permeable rock or sand and they are situated beneath impermeable layers. Oil is thus confined in such permeable layers and it can be extracted therefrom providing the well goes down to said layers.

When these permeable layers are reached, the oil 4, possibly mixed with other fluids, can flow towards the well by decompressing and can gush from the wellhead, or can be raised to the surface by pumping if its pressure is not sufficient.

It is thus clear that one of the parameters defining production quality of a well is the permeability of the layers in which the oil is confined.

An ideal well is a well whose quality corresponds exactly to that defined by its above-defined productivity index, but such a theoretical situation arises only very rarely.

Figure 1:
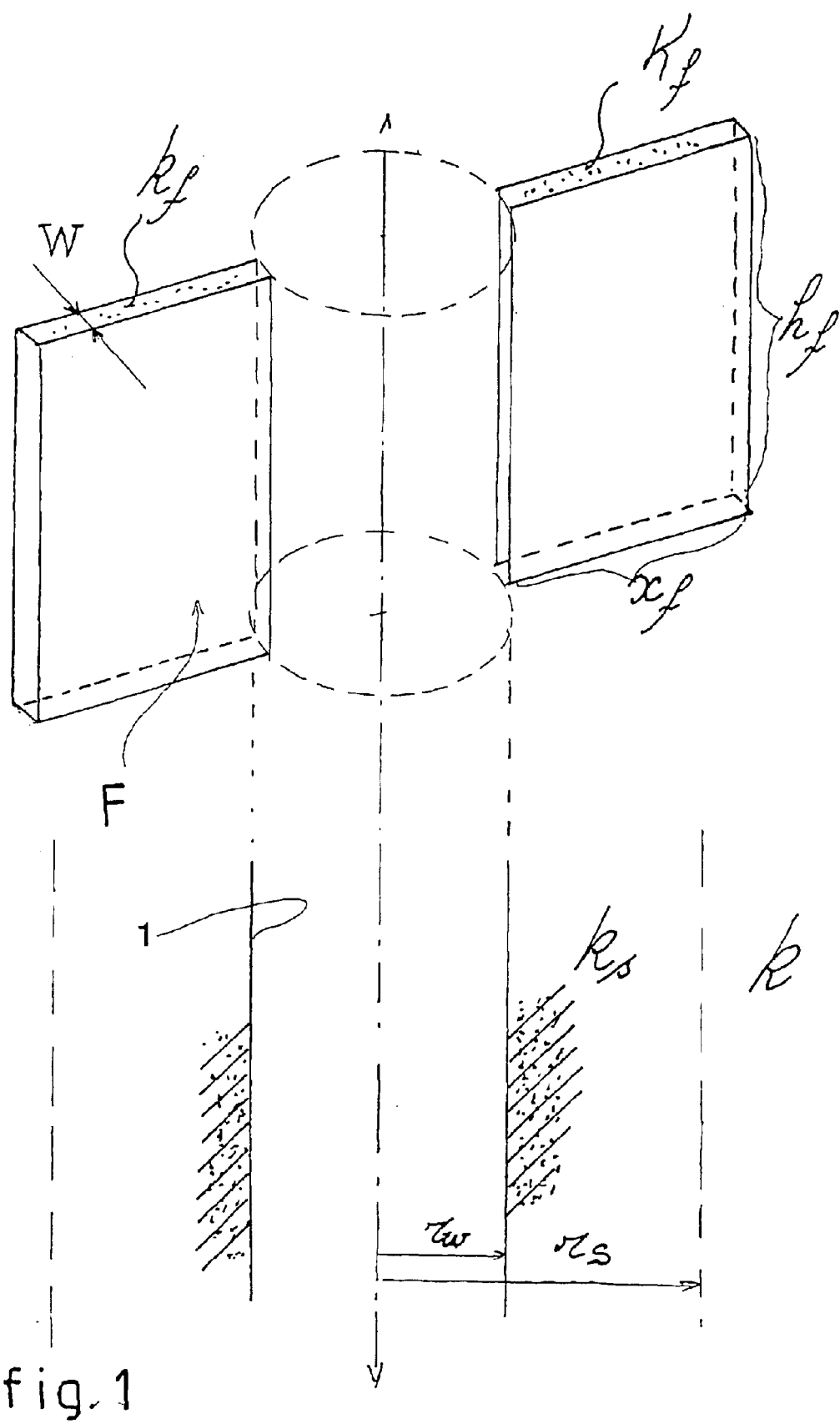
FIG. 1 is a diagram of a well having two types of damage: clogging giving a possible value for its "skin" and a thickness that is not zero; and a fracture "F" which presents a negative value for its "skin"

In contrast, numerous wells, such as the wells 1 shown diagrammatically in FIG. 1, include various types of damage. The damage represented diagrammatically in the lower portion of FIG. 1 is constituted by clogging giving a positive "skin" value S which is of a non-zero thickness, while the damage represented diagrammatically in the upper portion of FIG. 1 is constituted by a fracture "F" which presents a negative "skin" value S.

Figure 4:
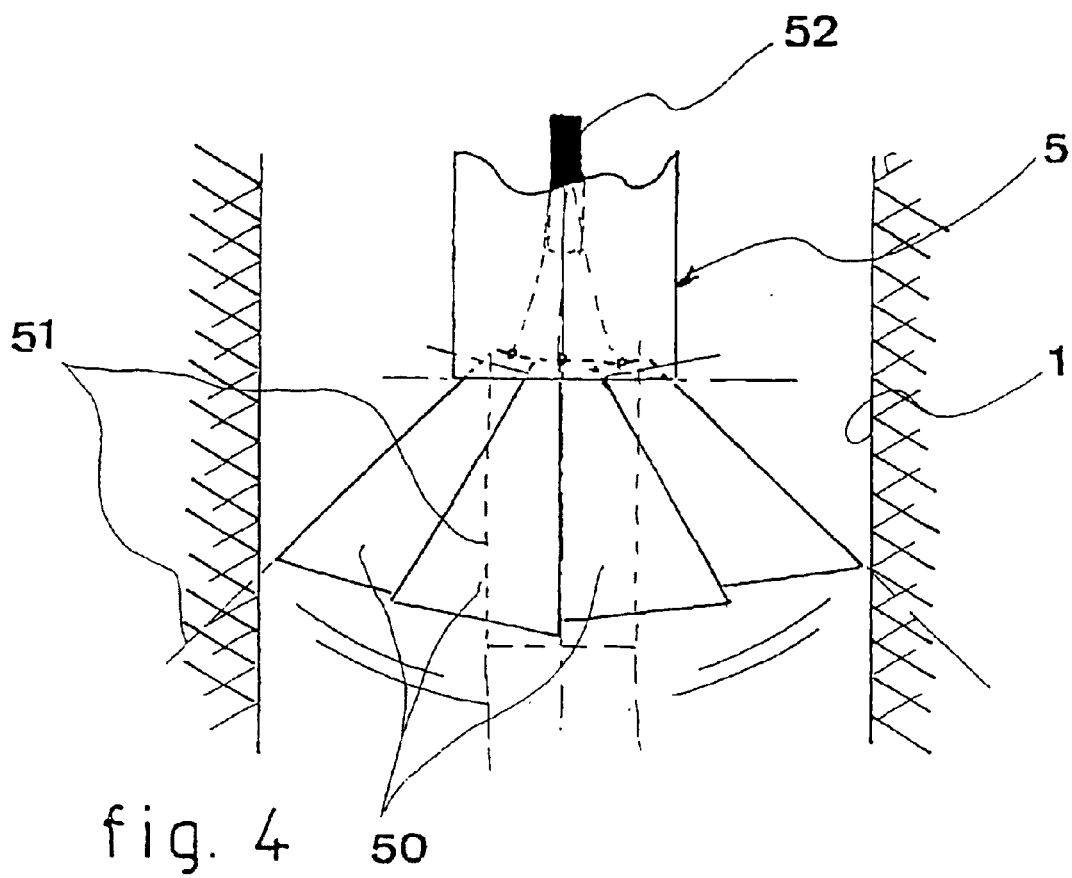
FIGS. 4 and 5 show two particular embodiments of other elements of the FIG. 2 apparatus, specifically means for modulating the downhole fluid flow rate.
Figure 5:
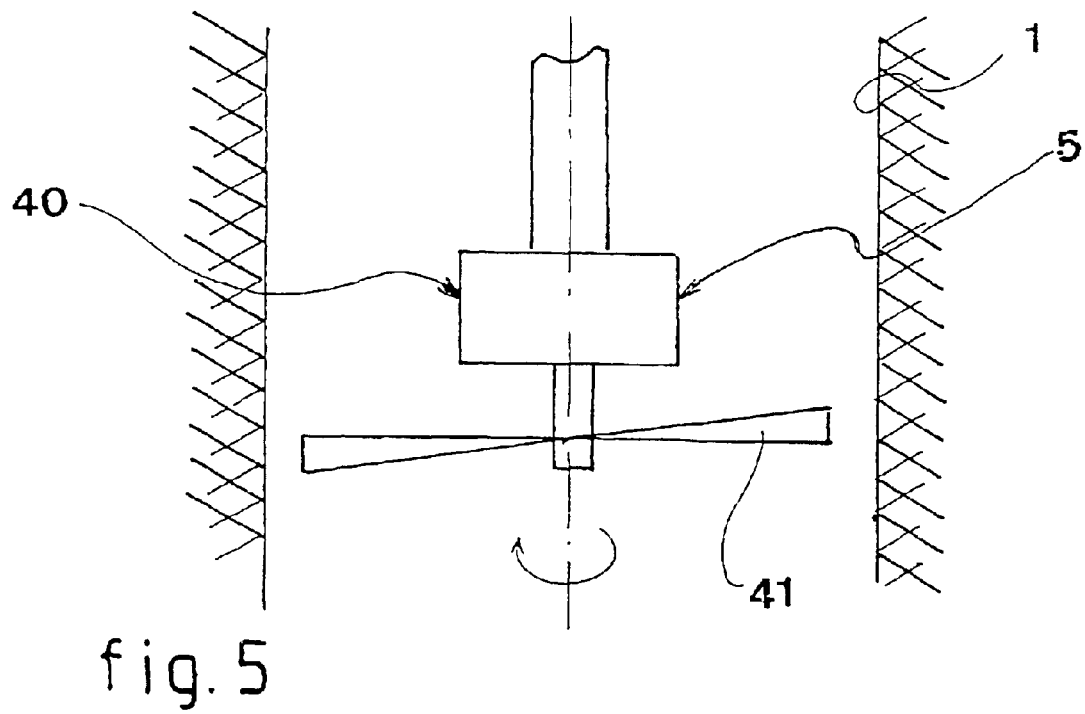

To implement the method of the invention, as described below, apparatus is used which is shown in highly diagrammatic manner in FIG. 2, and which comprises in particular:

A controllable shutter 5 enabling the flow section of the duct 6 formed by the well to be modulated in the oil-bearing layers 3. This controllable shutter may be constituted, for example, by a sleeve carrying fins suitable for being deployed by means of a motor from a remote point. It may also be constituted by a plurality of walls 50 arranged relative to one another so as to form a cone 51 of variable cone angle, for example as shown in FIG. 4, with the sliding of the walls 50 over one another being controllable by means of a pull cable 52.

Advantageously, the controllable shutter 5 may be constituted by an enclosure having a deformable wall whose inside is fed with fluid by means of a pump connecting it to a supply of fluid. By causing the pump to operate in one direction or the other, it is possible to inflate or deflate the enclosure, thereby modulating the flow section of the duct in which the enclosure is disposed.

In an advantageous embodiment as shown diagrammatically in FIG. 1, the controllable shutter 5 may be constituted by a turbine 40 or the like, e.g. comprising a propeller 41 or the like controlled by a motor in such a manner as to accelerate the flow rate of the well cyclically in the extraction direction, as explained below. This embodiment is advantageous for a well that is delivering at a considerable rate. By modulating the flow rate from the well between two values, both of which are above the nominal value for its fluid flow rate, while the reaction of the turbine tends to hold the entire tool including the controllable shutter and the other two elements 7 and 9 defined below down the well at the depth at which measurement is to be performed, thus preventing the flowing fluid entraining the tool in involuntary upward movement, and thus making it possible to provide means engaging the wall of the well that are smaller than is necessary for the other embodiments. It can happen that the rate at which oil is produced in a well is high enough to generate a pressure difference across the controllable shutter to such an extent as to cause the shutter to tend to be entrained in the same upward movement as the oil. This phenomenon is a drawback in terms of measurement accuracy and reliability. To eliminate this risk, the apparatus advantageously includes controllable means for securing the controllable shutter 5 to the wall of the well so as to hold it in place at the desired depth. These controllable means may be of any kind, for example being constituted by thin pads which are deployed under the control of a motor or a cable so as to become anchored in the wall of the well at the desired depth.

A flow meter 7 for measuring the flow rate of the fluid flowing in the duct 6. Such a flow meter is known in itself and can be constituted, in outline, by a sleeve having measurement means disposed therein comprising a propeller or "spinner", together with means for counting the number of revolutions of the propeller per unit time, the sleeve possibly being associated with a deflector so as to capture all of the fluid flowing in the duct 6 and force it to pass entirely along the sleeve. The flow meter 7 is arranged at its output 8 to deliver a signal that is representative of the flow rate of the fluid passing through it.

A pressure sensor 9, well known in itself, constituted for example by deformation gauges based, for example, on a mineral crystal such as a crystal of quartz or sapphire, or the like. It is suitable for delivering at its output 10 a signal that represents the pressure of the fluid in the duct 6.

In order to implement the method of the invention, these three elements are assembled together so as to enable them to be lowered from the wellhead 11 by any suitable means, for example a cable 12 or the like, down to the productive layers 3. They are also associated with one another in such a manner that when they are lowered down the well as shown in FIG. 2, the flow meter 7 and the pressure sensor 9 are situated beneath the controllable shutter 5. In addition, these three elements are connected to a bus line 13 which makes it possible from a processor member 14 to control the shutter 5, optionally to set the flow meter 7 and the pressure sensor 9 into operation, and in particular to receive and process the signals delivered by those two elements.

In addition to the three elements defined above, it is also specified that in order to acquire data, a clock is also provided which defines a unique time to which the flow rate and fluid pressure measurements are associated and which serves to determine the measurement phases $\Psi_q$ and $\Psi_p$ as defined below.

Once the above-described tool 5-7-9 has been lowered down the well 1 to a determined depth in the productive layer, the method consists initially in controlling the shutter 5 so as to vary the flow section of the duct 6 between a minimum value and a maximum value in application of a sinewave function having an angular frequency ω, the minimum value not being zero so as to ensure that the duct 6 is never completely closed off and so as to enable the fluid to continue to flow throughout the time measurements are being performed.

When the flow meter 7 and the pressure sensor 9 are not permanently in operation, they are set into operation for a plurality of periods of the mathematical function applied to control the shutter. They output signals that are representative respectively of the variations in the flow rate and in the pressure of the fluid in the well beneath the shutter 5, at the locations of said other two elements.

It is found that the curves plotting said variations are sinewave functions having the same period T as that applied to the shutter 5, but phase shifted relative to each other. Measuring both the phase offset between these two signals and the ratio of their respective amplitudes makes it possible to deduce a value which is representative of the permeability of the productive layers beneath the controllable shutter and situated between the level of the flow meter and the bottom of the well, and simultaneously also to deduce a value which is representative of clogging.

This method is advantageous for two reasons, since as well as enabling the permeability and the clogging within the oil-bearing layers to be evaluated, thereby eliminating numerous uncertainties that are inherent to prior art methods, it also makes it possible to evaluate said permeability and clogging at all levels of a productive layer, it being recalled that the term "clogging" is used to designate the phenomenon whereby the flow of oil is braked and which presents a positive "skin" value S (an image of resistance to flow). In contrast, the term "fracture" is used, as shown in FIG. 1, to designate means that encourage well productivity by presenting a negative "skin" value S (an image of reduced resistance to fluid flow).

It is nevertheless specified that a moderately negative value for the "skin" (typically: $-2<S<0$) does not necessarily mean that a crack or fracture is present, but can merely be the result of some local improvement in the permeability around the well, which might be natural or induced by acidification.

In order to implement the method, the tool 5-7-9 is lowered to the bottom of the well (shown in dashed lines in FIG. 2), and is then raised in stages with measurements being performed at each level.

In order to implement the method of the invention as described below for a well in a productive layer having a damaged zone with a positive "skin" value S, it is necessary to define the following parameters:

- $\phi$: the porosity of the rock, which is a variable that is generally known;
- $\mu$: the viscosity of the fluid 4 expressed in Pascal seconds (Pa.s) which is a variable that is generally known;
- $c_t$: the total compressibility of the fluid 4 expressed in $Pa^{-1}$, which is a variable that is generally known;
- k: the permeability of the productive layer 3 expressed in square meters ($m^2$), which is a variable that needs to be determined or estimated;
- h: the height of the productive layer 3 expressed in meters (m), which is a variable that is generally known:
- q: the complex sinewave flow rate of the fluid in the well 1; this is a variable which is known since it is imposed and measured, as mentioned above, and can be expressed using the following formula:

$$\Delta Q e^{i\Psi_q}$$

where $\Delta Q$ is the amplitude expressed in $m^3/s$ and $\Psi_q$ is phase expressed in radians and measured relative to the clock time of the measuring apparatus;

- p: the complex sinewave pressure of the fluid 4 in the well 1; this is a variable which is known since it is measured, as mentioned above, and can be expressed by the following formula:

$$\Delta P e^{i\Psi_p}$$

where $\Delta P$ is amplitude expressed in Pa and $\Psi_p$ is phase expressed in radians and measured relative to the clock time of the measuring apparatus;

- $R_S$: the complex response of the productive layer 3 which is given by the expression $$\frac{p}{q} \text{ i.e. } \frac{\Delta P}{\Delta Q} e^{-i\Psi} \text{ where } \frac{\Delta P}{\Delta Q}$$

represents the amplitude expressed in $Pa.s/m^3$ and $$\Psi = \Psi_q - \Psi_p$$

which is the phase lag expressed in radians for the pressure relative to the flow rate;

- $\omega$: the angular frequency of the cyclical sinewave test function expressed in $s^{-1}$ which is known since it is imposed; this angular frequency is related to the period T of the test cycle expressed in s by the formula $2\pi/T$;
- i: the imaginary unit number in the mathematical theory of complex numbers;
- $r_w$: the radius of the well 1 expressed in m, which is therefore known;
- $r_s$: the radius of the damaged zone expressed in m, an unknown variable, with the thickness of the damaged zone then being given by the value of $r_s - r_w$;
- $k_s$: the permeability of the damaged zone expressed in $m^2$, which is an unknown variable;
- $c_t$: the total compressibility of the fluid expressed in $Pa^{-1}$, a known magnitude: and
- $\mu$: the viscosity of the fluid expressed in Pa.s, a known magnitude.

By way of remainder, the parameters defined in the introduction of the present description are recalled, i.e.: IP the productivity index of the well expressed in units of $m^3.s^{-1}.Pa^{-1}$, i.e.

$$IP = \frac{2\pi k h}{\mu \left[\ln\left(\frac{R_e}{r_w}\right) - 0.75 + S\right]}$$

where $R_e$ is the drainage radius of the well expressed in m.

The following variables are deduced from the above-defined parameters:

$\delta$: the diffusivity of the productive layer expressed in $m^2.s^{-1}$ and equal to $$\frac{k}{\phi \mu c_t};$$

$$\alpha = \frac{k_s}{k}:$$

the non-dimensional permeability of the damaged zone (no units);

$$\beta = \frac{r_s}{r_w}:$$

the non-dimensional radius of the damaged zone (no units);

$$z_w = r_w \sqrt{\frac{\omega}{\delta}}:$$

a dimensionless formula in which the only unknown variable is the permeability k involved in defining the diffusivity $\delta$:

$R_D$: the non-dimensional complex response of the productive layer which is given by the following dimensionless expression:

$$\frac{2\pi k h p}{\mu q}$$

$R_0$: the complex response of an ideal well 1, for a "skin" value S of zero, given by the value:

$$R_0 = \frac{K_0(\sqrt{i}\,z_w)}{\sqrt{i}\,z_w K_1(\sqrt{i}\,z_w)}$$

in which $K_0$ and $K_1$ are modified Hankel functions.

The response of the well 1 damaged by a "skin" of value S and of zero thickness is given, for example in U.S. Pat. No. 3,559,476 by the following formula:

$$R_s(z_w) = R_0(z_w) + S.$$

Nevertheless, it is clear that a "skin" of zero thickness is merely theoretical. With the method of the invention, it is possible to determine the response of a well having a "skin" of value S and a thickness that is not zero, FIG. 1, equal to $r_s - r_w$.

According to the invention, when the productive layer has a damaged zone presenting a positive "skin" value S of non-zero thickness, the response R of the well is obtained by the equation:

$$R_c = \frac{D_{R_0}(\beta_{z_w}) - B}{-C_{R_0}(\beta_{z_w}) + A}$$

in which A, B, C, and D are functions of $z_w$, $\alpha$, and $\beta$, and are defined by the following equations:

$$A(z_w, \alpha, \beta) = i\frac{z_w}{\sqrt{\alpha}}e^{\frac{i\pi}{4}}\left[kelbe_0\left(\frac{\beta_{z_w}}{\sqrt{\alpha}}\right)kelke_1\left(\frac{z_w}{\sqrt{\alpha}}\right) - kelbe_1\left(\frac{z_w}{\sqrt{\alpha}}\right)kelke_0\left(\frac{\beta_{z_w}}{\sqrt{\alpha}}\right)\right]$$

$$B(z_w, \alpha, \beta) = \frac{1}{\alpha}\left[kelbe_0\left(\frac{z_w}{\sqrt{\alpha}}\right)kelke_0\left(\frac{\beta_{z_w}}{\sqrt{\alpha}}\right) - kelbe_0\left(\frac{\beta_{z_w}}{\sqrt{\alpha}}\right)kelke_0\left(\frac{z_w}{\sqrt{\alpha}}\right)\right]$$

$$C(z_w, \alpha, \beta) = i\beta_{z_w^2}\left[kelbe_1\left(\frac{z_w}{\sqrt{\alpha}}\right)kelke_1\left(\frac{\beta_{z_w}}{\sqrt{\alpha}}\right) - kelbe_1\left(\frac{\beta_{z_w}}{\sqrt{\alpha}}\right)kelke_1\left(\frac{z_w}{\sqrt{\alpha}}\right)\right]$$

$$D(z_w, \alpha, \beta) = i\frac{\beta_{z_w}}{\sqrt{\alpha}}e^{\frac{i\pi}{4}}\left[kelbe_0\left(\frac{z_w}{\sqrt{\alpha}}\right)kelke_1\left(\frac{\beta_{z_w}}{\sqrt{\alpha}}\right) - kelbe_1\left(\frac{\beta_{z_w}}{\sqrt{\alpha}}\right)kelke_0\left(\frac{z_w}{\sqrt{\alpha}}\right)\right]$$

it also being specified that in the equations given above:

$$kelke_n(x) = ker_n(x) + i\,kei_n(x)$$

and $$kelbe_n(x) = ber_n(x) + i\,bei_n(x)$$

where i is the unit imaginary number in complex number theory, $ker_n$, $kei_n$, $ber_n$, and $bei_n$ being Kelvin functions as are known in this field.

It is also specified that $R_c$ is converted into $R_s$ by assuming in the two above-mentioned circumstances of a clogged well or a well having a fracture that ks>>k or that $k_s$<<K, for example with $\alpha = 10^{\pm 3}$ and with $\beta$ being replaced by $$e^{\frac{S\alpha}{1-\alpha}},$$

it also being observed that $$S = \left(\frac{1}{\alpha} - 1\right)\ln\beta$$

with ln representing natural logarithms.

Thus, by performing a plurality of measurements with different periods T, it is possible to invert the results so as to determine $z_w$, $\alpha$, and $\beta$, since each test provides an independent pair of independent relationships.

In theory, two measurements corresponding to two different periods would suffice for determining $z_w$, $\alpha$, and $\beta$, from which the intact permeability k, the degraded permeability $k_s$, and the depth of the damage $r_s$ can be deduced. More simply, a single measurement suffices for determining S and $z_w$ from which the intact permeability k can be deduced when it is assumed that the damage is of negligible thickness.

In contrast, when the productive layer includes a fracture F representing a negative "skin" value, see FIG. 1, the response $R_f$ of the well is obtained by the equation:

$$R_f = \frac{\pi}{F_{CD}\sqrt{\frac{i^2 z_f}{E_{fD}} + \frac{2\sqrt{i}\,z_f}{F_{CD}}}} + S_{wf}$$

in which $$z_f = x_f\sqrt{\frac{\omega}{\delta}}$$

is a dimensionless parameter based on the unknown magnitudes $x_f$ and k related by the diffusivity $\delta$, $F_{CD}$ is the dimensionless conductivity of the fracture F (a dimensionless number), which is defined by $$\frac{k_f w}{k x_f},$$

$$E_{fD} = \frac{k_f \varphi c_t}{k \varphi_f c_{tf}}$$

is the non-dimensional diffusivity of the fracture (a dimensionless number) which is the ratio of the diffusivity of the fluid in the fracture to the diffusivity of the fluid in the deposit, $S_{wf}$ is a "skin" that might be generated by any kind of loss of conductivity existing between the bottom of the well and the entry of the fracture, with:

$k_f$: the permeability of the material supporting the fracture taken perpendicularly to the axis of the well, expressed in m², an unknown magnitude;

w: the mean width of the fracture, expressed in m, an unknown magnitude;

$k_f w$: the conductivity of the fracture, expressed in m³, an unknown derived magnitude;

$x_f$: the length of one wing of the fracture which is assumed to comprise two wings, expressed in m, an unknown magnitude;

k: the permeability of the above-defined productive layer, expressed in $m^2$, an unknown magnitude;

$\phi$: the porosity of the productive layer, an unknown magnitude;

$\phi_f$: the porosity of the support material filling the fracture, an unknown magnitude;

$c_t$: the above-defined total compressibility of the fluid in the productive layer, expressed in $Pa^{-1}$, a known magnitude; and $c_{tf}$: the total compressibility of the fluid in the fracture, equal to the compressibility of the fluid plus the compressibility of the support material, a known magnitude.

By performing at least two cyclical tests with two different periods T, four independent relationships are obtained between the non-dimensional parameters $z_f$, $F_{CD}$, $E_{fD}$, $S_{wf}$ which, together with the data concerning the volume of support material filling the fracture which is a magnitude that is known because the mass that was injected was measured when it was put into place by hydraulic fracturing, thereby providing a value for the product $w.x_f$ since the height of the fracture is also known, thereby making it possible to determine the five unknown magnitudes: $x_f$, w, $k_f$, k, and $S_{wf}$.

It is also possible to make do without the data concerning the volume of the supported fracture by making at least three tests at three different periods in order to obtain at least six relationships between the five unknown variables that are to be determined.

The method is easily implemented with the apparatus as shown diagrammatically in FIG. 2 and as defined in general manner above.

Figure 3:
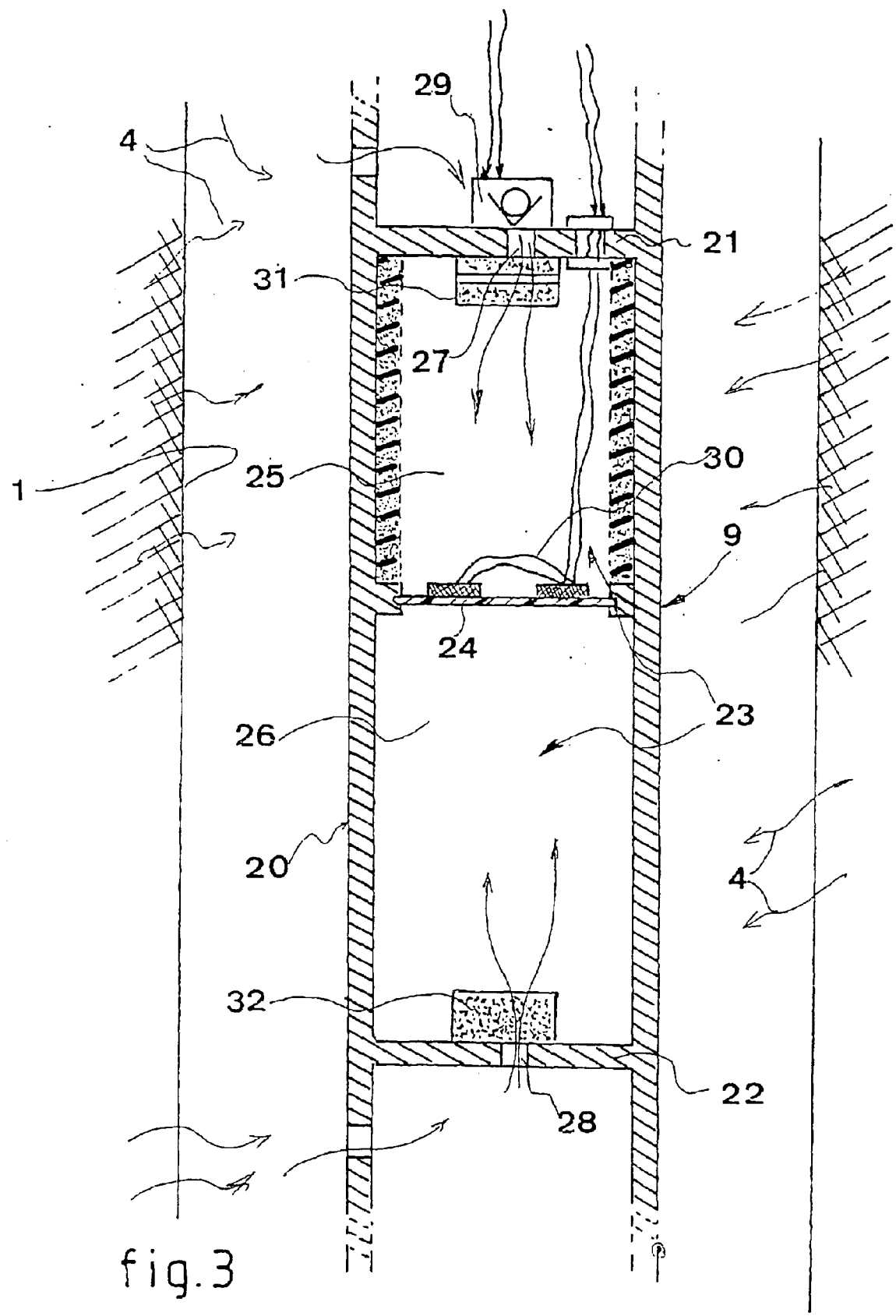
FIG. 3 shows a particular embodiment of one of the elements of the FIG. 2 apparatus, specifically the pressure sensor.

Nevertheless, given that the amplitude of the variations in the pressure of the fluid at the bottom of the well is relatively small compared with the pressure that generally exists at that point, it is advantageous for the pressure sensor which is shown diagrammatically under reference 9 in FIG. 2 to present a structure of the kind shown in FIG. 3.

In the embodiment shown in FIG. 3, the pressure sensors 9 comprises a rigid enclosure 20 constituted by a cylindrical wall, for example. This rigid enclosure is associated with first and second end walls 21 and 22 so as to define a main closed volume 23, and with a flexible and elastic diaphragm 24 inside the main volume 23 for defining first and second secondary volumes 25 and 26 therein which are separated from each other in leakproof manner by said diaphragm 24.

The pressure sensor 9 also has two orifices 27 and 28 made in the respective end walls 21 and 22 so as to put the two secondary volumes 25 and 26 into communication with the surrounding medium, and in particular the medium inside the well when the pressure sensor is lowered therein.

The sensor also has a controllable valve 29, e.g. a solenoid valve or the like associated with the orifice 27 to control the passage of fluid through said orifice 27 formed in the first above-defined end wall 21.

The diaphragm 24 is associated with means 30 for measuring any deformation thereof and applied thereto as explained below. In an advantageous embodiment, these means 30 are constituted by deformation gauges for measuring strain which are applied to the diaphragm 24, these gauges being positioned in conventional manner against the surface of the diaphragm 24.

Advantageously, the pressure sensor 9 also has filters 31 and 32 associated with the respective orifices 27 and 28 in order to filter the fluid for filling the two secondary volumes 25 and 26.

This embodiment of the pressure sensor 9 is particularly advantageous, specifically when implementing the above-described method.

With this embodiment, it is possible to make a diaphragm 24 of very small thickness, and thus to obtain a pressure sensor having high sensitivity in spite of the high pressures that can exist down a well 1.

The pressure sensor 9 is used as follows.

As mentioned above, it is lowered together with the other elements 5 and 7 to the bottom of the well 1, the controllable valve 29 then being in the open position. In this way, the fluid to be found down the well at high pressure fills both secondary volumes 25 and 26 which are thus at the same pressure, i.e. the pressure that exists at the bottom of the well. These two pressures acting on opposite sides of the diaphragm 24 are equal, so the diaphragm can withstand very high pressures in spite of its small thickness.

While the method is being implemented and the flow rate of the fluid in the well is being modulated, the controllable valve 29 is put into its closed position. Because the flow rate of the fluid is being modulated, pressure variations in the fluid are applied to the second secondary volume 26 and thus to the face 24 of the diaphragm 24 that faces said second secondary volume. These pressure variations take place about a nominal value for the downhole pressure and their amplitudes are relatively small. Since the pressure difference applied across the diaphragm 24 is relatively small, the diaphragm may be of very small thickness, thus making it possible to obtain a pressure sensor 9 that is very sensitive.

This sensitivity is further improved by giving the first secondary volume a relatively large value determined so as to make use of the compressibility of the fluid, even if the compressibility is small, for the purpose of observing variation in the first secondary volume. When there exists a pressure difference between the two secondary volumes 25 and 26, the diaphragm 24 can deform by reducing or increasing the first secondary volume 25.

With this embodiment, the pressure that exists in the first secondary volume 25 is a reference pressure of relatively constant value of the same order of magnitude as the pressure of the fluid 4 that is to be measured, regardless of the depth in the well at which the measurement is performed.

What is claimed is:

1. A method of determining the reserve quality of an oil well or the like delivering a given fluid coming from a productive layer, by measuring the response R of the well, said method consisting in modulating the flow rate of the fluid in the well by means of a sinewave function, and in measuring the variations in the flow rate and the pressures of the fluid, the method being characterized by the fact that:

I) the response Rc of the well when said productive layer includes a damaged zone presenting a positive "skin" value S for "skin" of non-zero thickness is obtained by the equation:

$$R_c = \frac{D_{R_0}(\beta_{z_w}) - B}{-C_{R_0}(\beta_{z_w}) + A},$$

and that

II) the response Rf of the well when the productive layer has a fracture presenting a negative "skin" value S is obtained by the equation:

$$R_f = \cfrac{\pi}{F_{CD}\sqrt{\cfrac{i^2 z_f}{E_{fD}} + \cfrac{2\sqrt{i}\, z_f}{F_{CD}}}} + S_{wf}$$

in which equations:

A, B, C, and D are functions of the parameters $z_w$, $\alpha$, and $\beta$, as defined below, and are respectively defined by the following four equations:

$$A(z_w, \alpha, \beta) = i\frac{z_w}{\sqrt{\alpha}}e^{\frac{i\pi}{4}}\left[kelbe_0\left(\frac{\beta z_w}{\sqrt{\alpha}}\right)kelke_1\left(\frac{z_w}{\sqrt{\alpha}}\right) - kelbe_1\left(\frac{z_w}{\sqrt{\alpha}}\right)kelke_0\left(\frac{\beta z_w}{\sqrt{\alpha}}\right)\right]$$

$$B(z_w, \alpha, \beta) = \frac{1}{\alpha}\left[kelbe_0\left(\frac{z_w}{\sqrt{\alpha}}\right)kelke_0\left(\frac{\beta z_w}{\sqrt{\alpha}}\right) - kelbe_0\left(\frac{\beta z_w}{\sqrt{\alpha}}\right)kelke_0\left(\frac{z_w}{\sqrt{\alpha}}\right)\right]$$

$$C(z_w, \alpha, \beta) = i\beta z_w^2\left[kelbe_1\left(\frac{z_w}{\sqrt{\alpha}}\right)kelke_1\left(\frac{\beta z_w}{\sqrt{\alpha}}\right) - kelbe_1\left(\frac{\beta z_w}{\sqrt{\alpha}}\right)kelke_1\left(\frac{z_w}{\sqrt{\alpha}}\right)\right]$$

$$D(z_w, \alpha, \beta) = i\frac{\beta z_w}{\sqrt{\alpha}}e^{\frac{i\pi}{4}}\left[kelbe_0\left(\frac{z_w}{\sqrt{\alpha}}\right)kelke_1\left(\frac{\beta z_w}{\sqrt{\alpha}}\right) - kelbe_1\left(\frac{\beta z_w}{\sqrt{\alpha}}\right)kelke_0\left(\frac{z_w}{\sqrt{\alpha}}\right)\right]$$

it being specified that in the equations given above:

$$kelke_n(x) = ker_n(x) + i\, kei_n(x)$$

and $$kelbe_n(x) = ber_n(x) + i\, bei_n(x)$$

where i is the imaginary unit number in the mathematical theory of complex numbers and where $ker_n$, $kei_n$, $ber_n$, and $bei_n$ are Kelvin functions;

$$\alpha = \frac{k_s}{k}$$

is the non-dimensional permeability of the damaged zone, $k_s$ representing the permeability of the damaged zone, and k representing the permeability of the productive layer;

$$\beta = \frac{r_s}{r_w}$$

is the non-dimensional radius of the damaged zone, $r_s$ representing the radius of the damaged zone, and $r_w$ representing the radius of the well;

$$z_w = r_w\sqrt{\frac{\omega}{\delta}}$$

where $\omega$ is the angular frequency of the sinewave function and $\delta$ is the diffusivity of the productive layer equal to $$\frac{k}{\varphi\mu c_t},$$

$\phi$ representing the porosity of the productive layer, $\mu$ representing the viscosity of the fluid, and $c_t$ representing the total compressibility of the fluid;

$$R_0 = \frac{K_0(\sqrt{i}\, z_w)}{\sqrt{i}\, z_w K_1(\sqrt{i}\, z_w)}$$

where $K_0$ and $K_1$ are modified Hankel functions; and also with $$z_f = x_f\sqrt{\frac{\omega}{\delta}}$$

where $x_f$ is the length of one of the wings of the fracture which is assumed to have two wings; $F_{CD}$ is the non-dimensional conductivity of the fracture represented by the formula $$\frac{k_f W}{k x_f},$$

where $k_f$ represents the permeability of the material supporting the fracture and w represents the mean thickness of the supported fracture;

$$E_{fD} = \frac{k_f \varphi c_t}{k \varphi_f c_{tf}}$$

is the non-dimensional diffusivity of the fracture, $\phi_f$ representing the porosity of the support material filling the fracture, and $c_{tf}$ representing the total compressibility of the fluid in the fracture; $S_{wf}$ is a "skin" if any, existing between the bottom of the well and the entry of the fracture.

2. A method according to claim 1, characterized by the fact that the flow rate of the fluid in the well is modulated by accelerating the flow rate between two values, both of which are greater than the nominal value of the flow rate of the fluid in the well.

3. Apparatus for implementing the method according to claim 1, characterized by the fact that it comprises an assembly made up of a controllable shutter (5), a flow meter (7), and a pressure sensor (9), these elements being associated with one another in such a manner that when lowered down the well, the flow meter and the pressure sensor are situated beneath the controllable shutter.

4. Apparatus according to claim 3, characterized by the fact that said pressure sensor (9) has a rigid enclosure (20) with first and second end walls (21, 22) for defining within said enclosure a main closed volume (23), a flexible and elastic diaphragm (24) disposed inside the main volume (23) to subdivide it into first and second secondary volumes (25, 26), first and second orifices (27, 28) formed respectively in the first and second end walls (21, 22), a controllable valve (29) for controlling the passage of a fluid through the first orifice (27), and means (30) for measuring deformation of said diaphragm (24).

5. Apparatus according to claim 4, characterized by the fact that the means (30) for measuring deformation of said diaphragm (24) are constituted by deformation gauges.

6. Apparatus according to claim 4, characterized by the fact that said pressure sensor (9) also includes filters (31, 32) associated with the first and second orifices (27, 28) respectively.

7. Apparatus according to any one of claims 3, characterized by the fact that the controllable shutter (5) is constituted by a turbine (40) controlled so as to be capable of cyclically accelerating the flow rate of the fluid in the well in the extraction direction between two values both of which are greater that the nominal value of the flow rate of the fluid in the well.

* * * * *